United States Patent [19]

Zangenehpour

[11] Patent Number: 5,224,217
[45] Date of Patent: Jun. 29, 1993

[54] COMPUTER SYSTEM WHICH USES A LEAST-RECENTLY-USED ALGORITHM FOR MANIPULATING DATA TAGS WHEN PERFORMING CACHE REPLACEMENT

[76] Inventor: Saied Zangenehpour, 4756 Notredame, Stevensville, Mich. 49127

[21] Appl. No.: 924,391

[22] Filed: Aug. 3, 1992

Related U.S. Application Data

[63] Continuation of Ser. No. 292,579, Dec. 30, 1988, abandoned.

[51] Int. Cl.⁵ .............................................. G06F 12/00
[52] U.S. Cl. ............................... 395/425; 364/243.0; 364/243.2; 364/243.41; 364/DIG. 1; 395/800
[58] Field of Search ............................. 395/800, 425

[56] References Cited

U.S. PATENT DOCUMENTS

| | | | |
|---|---|---|---|
| 3,737,881 | 6/1973 | Cordi et al. | 364/900 |
| 3,806,883 | 4/1974 | Weisbecker | 395/425 |
| 3,949,369 | 4/1976 | Churchill, Jr. | 364/200 |
| 4,008,460 | 2/1977 | Bryant et al. | 395/425 |
| 4,168,541 | 9/1979 | DeKarske | 365/49 |
| 4,322,795 | 3/1982 | Lange et al. | 395/425 |
| 4,334,289 | 6/1982 | Lange et al. | 364/900 |
| 4,458,310 | 7/1984 | Chang | 395/425 |
| 4,459,662 | 7/1984 | Skelton et al. | 364/200 |
| 4,489,378 | 12/1984 | Dixon et al. | 364/200 |
| 4,530,054 | 7/1985 | Hamstra et al. | 364/200 |
| 4,607,331 | 8/1986 | Goodrich, Jr. et al. | 395/425 |
| 4,636,946 | 1/1987 | Hartung et al. | 364/200 |
| 4,672,536 | 6/1987 | Giroir et al. | 364/200 |
| 4,680,729 | 7/1987 | Steinhart | 364/900 |
| 4,755,968 | 7/1988 | Yoshida et al. | 365/189.08 |
| 4,783,785 | 11/1988 | Miu et al. | 364/200 |
| 4,785,395 | 11/1988 | Keeley | 364/200 |
| 4,785,398 | 11/1988 | Joyce et al. | 364/200 |
| 4,802,086 | 1/1989 | Gay et al. | 364/200 |
| 4,835,686 | 5/1989 | Furuya et al. | 364/200 |
| 4,962,451 | 10/1990 | Case et al. | 364/900 |

Primary Examiner—Thomas C. Lee
Assistant Examiner—William M. Treat

[57] ABSTRACT

The invention is an improved method of implementing the "least-recently-used" (LRU) replacement algorithm in a cache memory. Each data block in the cache memory is numbered with a priority tag ranging from 0 to the number of blocks in the cache memory. The lowest numbered block is always replaced first. The just replaced block is given the highest priority tag and one is subtracted from each other priority tag. When a requested block is found in the cache, one is subtracted from each priority tag greater than the requested priority tag and the requested block is given the highest priority tag.

3 Claims, 3 Drawing Sheets

| FRAME | | MISS | MISS | MISS | HIT ON I | HIT ON C | HIT ON F | HIT ON L | HIT ON J |
|---|---|---|---|---|---|---|---|---|---|
| A | 00 | 15 | 14 | 13 | 12 | 12 | 11 | 10 | 9 |
| B | 01 | 0 | 15 | 14 | 13 | 13 | 12 | 11 | 10 |
| C | 02 | 1 | 0 | 15 | 14 | 15 | 14 | 13 | 12 |
| D | 03 | 2 | 1 | 0 | 0 | 0 | 0 | 0 | 0 |
| E | 04 | 3 | 2 | 1 | 1 | 1 | 1 | 1 | 1 |
| F | 05 | 4 | 3 | 2 | 2 | 2 | 15 | 14 | 13 |
| G | 06 | 5 | 4 | 3 | 3 | 3 | 2 | 2 | 2 |
| H | 07 | 6 | 5 | 4 | 4 | 4 | 3 | 3 | 3 |
| I | 08 | 7 | 6 | 5 | 15 | 14 | 13 | 12 | 11 |
| J | 09 | 8 | 7 | 6 | 5 | 5 | 4 | 4 | 15 |
| K | 10 | 9 | 8 | 7 | 6 | 6 | 5 | 5 | 4 |
| L | 11 | 10 | 9 | 8 | 7 | 7 | 6 | 15 | 14 |
| M | 12 | 11 | 10 | 9 | 8 | 8 | 7 | 6 | 5 |
| N | 13 | 12 | 11 | 10 | 9 | 9 | 8 | 7 | 6 |
| O | 14 | 13 | 12 | 11 | 10 | 10 | 9 | 8 | 7 |
| P | 15 | 14 | 13 | 12 | 11 | 11 | 10 | 9 | 8 |

COMPUTER SYSTEM WHICH USES A LEAST-RECENTLY-USED ALGORITHM FOR MANIPULATING DATA TAGS WHEN PERFORMING CACHE REPLACEMENT

This application is a continuation of U.S. Ser. No. 07/292,579, filed Dec. 30, 1988 now abandoned.

FIELD OF THE INVENTION The invention is related to cache memories, apparatuses and methods for increasing the efficiency of cache memories and more specifically to a method and apparatus for implementing a least-recently-used replacement algorithm in a cache memory for a mass storage controller.

CROSS REFERENCE TO RELATED APPLICATIONS

This application is related to but in no way dependent on "Method and Apparatus for Positioning Head of Disk Drive Using Zone-Bit-Recording," Ser. No. 07/641,264, filed Sep. 15, 1991, "Two Stage Cache Memory System and Method," Ser. No. 07/918,892, filed Jul. 16, 1992, which is a continuation of Ser. No. 07/657,969, filed Feb. 20, 1991 and now abandoned, which is a continuation of Ser. No. 07/292,189, filed Dec. 30, 1988 and now abandoned, and "Dynamic Prefetching for a Cache Memory," filed originally as Ser. No. 07/345,915 on May 1, 1989, abandoned, and now U.S. Pat. No. 5,146,578, all of common ownership and inventorship herewith.

BACKGROUND OF THE INVENTION

Information or data can be stored relatively inexpensively in various magnetic or optical mass-storage devices such as tapes, disks or drums. These devices are slow, non-volatile, and only provide for access to large blocks of data. Silicon-based random access memory (RAM) is significantly faster, provides for random byte-by-byte access to data, but is volatile, and more expensive. The difference in speed is often several orders of magnitude.

It is therefore common practice in the computer industry to mass-store data in magnetic or optical mass-storage devices, transfer the data to RAM for use or modification, and then transfer the data back to mass-storage devices.

Due to the speed difference between RAM and mass-storage devices, a computer process is significantly delayed when more data is needed from a mass-storage device. Several methods are used to minimize such delays.

One common approach is the use of a cache memory. Such a memory is usually silicon based and part of the mass-storage controller. When the computer requests data from the mass-storage device, the requested data is fetched from the mass-storage device alone with a prefetch of more data than requested. The prefetched data is loaded into the cache memory (located in the mass-storage controller) in hopes that the data that is subsequently requested will already be in the cache memory. The requested data is also retained assuming that it is likely to be used again. Each subsequent request for data is checked first against the cache memory before it is fetched from the mass-storage device. Data that is already in the cache memory can be supplied to the computer much faster than data that must be fetched from a mass-storage device.

Dynamic RAM memory can only accept data (write) or give data (read) at a given time. It is therefore important that the cache memory be able to read and write as quickly as possible so it is available for other requests. The cache memory spends a majority of its time in communication with mass-storage devices because mass-storage devices are so much slower than RAM.

The hit ratio is the number of requests found in the cache memory divided by the total number of requests. The hit ratio is a common measure of the success in fetching and retaining the right data.

It is assumed that data that has been requested before is likely to be requested again. Therefore, the cache retains data as long as it can. However, data must be replaced when the cache is full and additional data is requested.

There are several methods of determining which data in a cache to replace. The most common is "first-in first-out" (FIFO). This is like a queue or a line. The first data to be put into the cache memory is the first data to be removed from the cache memory. Another common method is "least-recently-used" (LRU). In this method the data that has not been used for the longest time is replaced. LRU is usually implemented with complicated timers or counters that determine the amount of time since the last request.

Prior art: U.S. Pat. No. 3,806,883—Weisbecker, "Least Recently Used Location Indicator"; U.S. Pat. No. 4,008,460—Bryant et al., "Circuit for Implementing a Modified LRU Replacement Algorithm for a Cache"; U.S. Pat. No. 4,168,541—DeKraske, "Paired Least Recently Used Block Replacement System"; U.S. Pat. No. 4,322,795—Lange et al., "Cache Memory Utilizing Selective Clearing and Least Recently Used Updating"; U.S. Pat. No. 4,458,310—Chang, "Cache Memory Using a Lowest Priority Replacement Circuit"; U.S. Pat. No. 4,607,331—Goodrich, Jr. et al., "Method and Apparatus for Implementing an Algorithm Associated with Stored Information"; U.S. Pat. No. 4,755,968—Yoshida et al., "Buffer Memory Device Controlled by a Least Recently Used Method".

SUMMARY OF THE INVENTION

The invention is an improved method of Implementing the least-recently used (LRU) data replacement algorithm in a cache memory. Each data block in the cache memory is assigned a priority tag number ranging from a lowest priority tag number up to a highest priority tag number. When a cache miss occurs, the block with the lowest number is always replaced with a new block. The new block is assigned the highest priority tag number and the tag numbers of the remaining blocks are decremented. When a requested block is found in the cache, one is subtracted from each tag number greater than that of the requested block, and its number is assigned highest priority tag number.

OBJECTS OF THE INVENTION

It is a principal object of this invention to provide a more efficient method of replacing data in a cache memory.

It is another object of this invention to implement the least-recently-used method in a more efficient manner.

It is another object of this invention to implement the least-recently-used method while reducing the cost of the implementation.

It is another object of this invention to implement the least-recently-used method while reducing processing time required for the implementation.

BRIEF DESCRIPTION OF THE DRAWINGS

Preferred embodiments demonstrating the various objectives and features of the invention will now be described in conjunction with the following drawings.

DETAILED DESCRIPTION OF THE PREFERRED EMBODIMENT OF THE INVENTION

The LRU replacement algorithm, according to this invention, is implemented by assigning each data block in the cache memory a priority tag ranging from zero to a number equal to the total number of blocks in the cache memory. The block with the lowest priority tag is always replaced first. The just substituted block is given the highest priority tag and each other priority tag is decremented by one count. When a request is made for a block already in the cache, all block priority tags higher in number than the requested priority tag are decremented by one count and the requested block is assigned the highest priority tag.

Logically this method suggests a line of data blocks where the least recently used block is at the end of the line and the most recently used block is at the head of the line. When a new block of data is placed in the cache memory, it is placed at the head of the line. All remaining blocks are moved down and the least recently used block at the end of the line is eliminated. When a block that is already in the line is selected, it moves to the head of the line and those blocks above it in line move up.

It is, however, very inefficient to move blocks around in this manner. While he present invention could be implemented by moving blocks as described, such would not be the most practical approach. In accordance with a preferred execution of this invention, the data blocks remain stationary in memory, and priority tags associated with each block, denoting each blocks location in line are changed.

Figure 1:
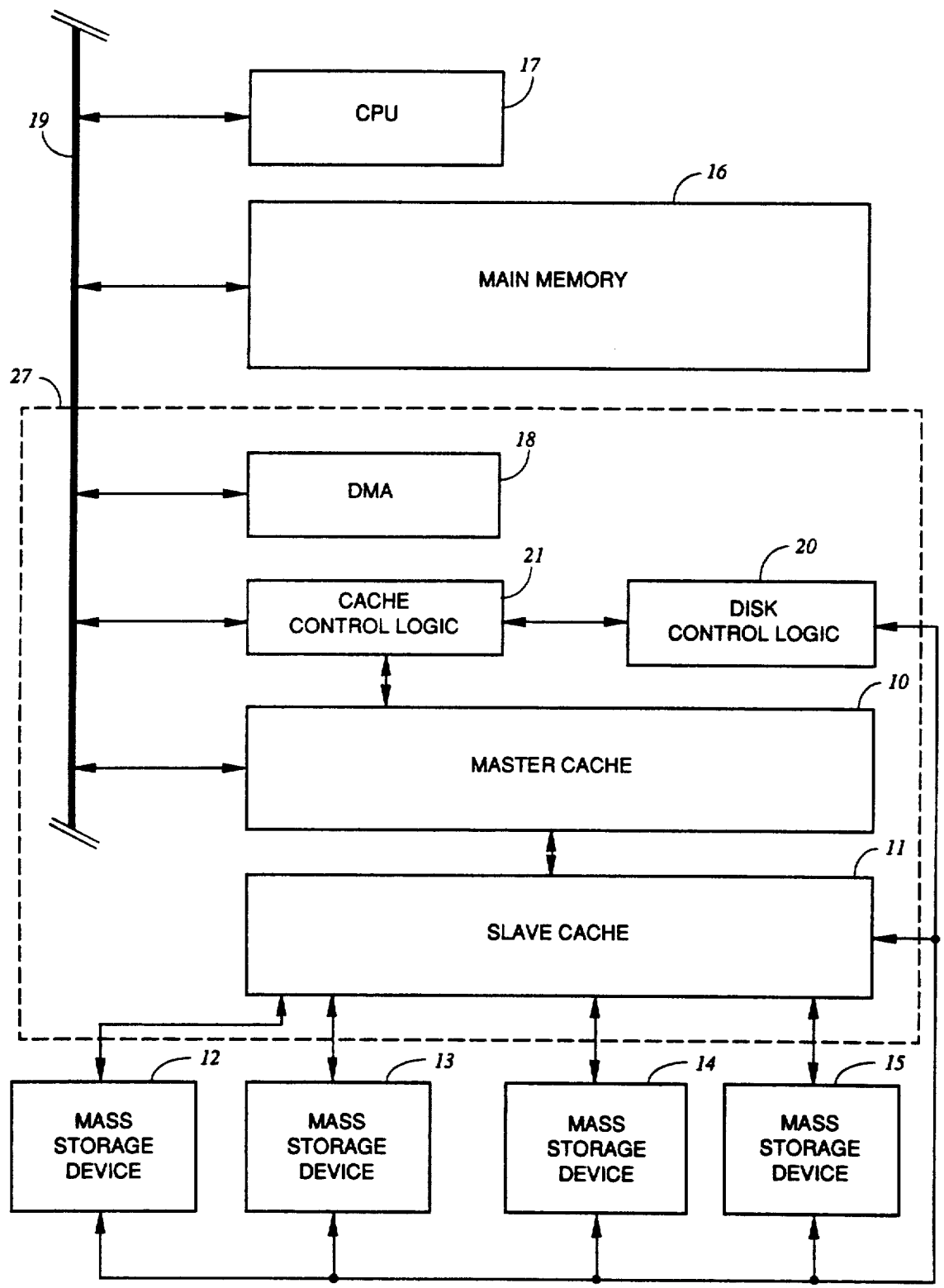
FIG. 1 is a block diagram of the preferred computer system showing the location of the cache memory in the preferred computer system.

Referring to FIG. 1, a request to move data from mass-storage devices 12-15 to main memory 16 is initiated by the central processing unit (CPU) 17. It is sent over bus 19 by CPU 17 or direct-memory access controller (DMA) 18 to disk control logic 20. However, the cache control logic 21 intercepts the request and checks the master cache 10 for the requested data. If the requested data is in the master cache, it is transferred over bus 19 to main memory 16. If the requested data is not in the master cache 10, the request is passed along to disk control logic 20. Disk control logic 20 determines which mass-storage device contains the requested data and where on that device the data resides. The requested data is sent from the mass-storage device to slave cache 11. Slave cache 11 acts as a speed adjustment buffer. It collects the requested data from the mass-storage device at its slower speed, and then sends it out again in the same order to master cache 10 at a much higher speed. The requested data is then sent from master cache 10 to main memory 16 via bus 19.

Figures 2, 4:
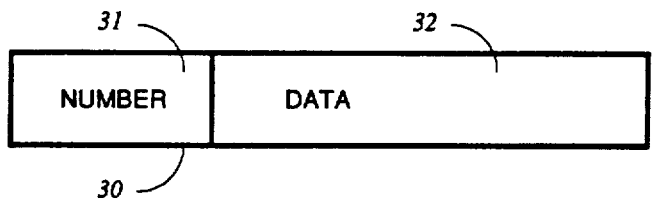
FIG. 2 is a diagram of the structure of each data frame in the preferred memory.
FIG. 4 is a block diagram of the memory space in the preferred cache memory showing data and priority tag movement in a few sample transactions.

FIG. 2 shows the logical structure of each data frame 30 in the cache memory. A frame is a unit of memory space in the cache. A block is a unit of data. Each frame will hold one block of data. The priority field 31 contains the priority tag which is a measure of how recently its corresponding block has been used (position in the line). The highest number represents the most recently used block (head of the line) and the lowest number represents the least-recently-used block (end of the line). Following the priority field is the data field 32. The data field holds one block of data corresponding to the priority tag in the priority field. The data corresponding to the lowest priority tag (head of the line) is always replaced by new data being written to the cache.

Figure 3:
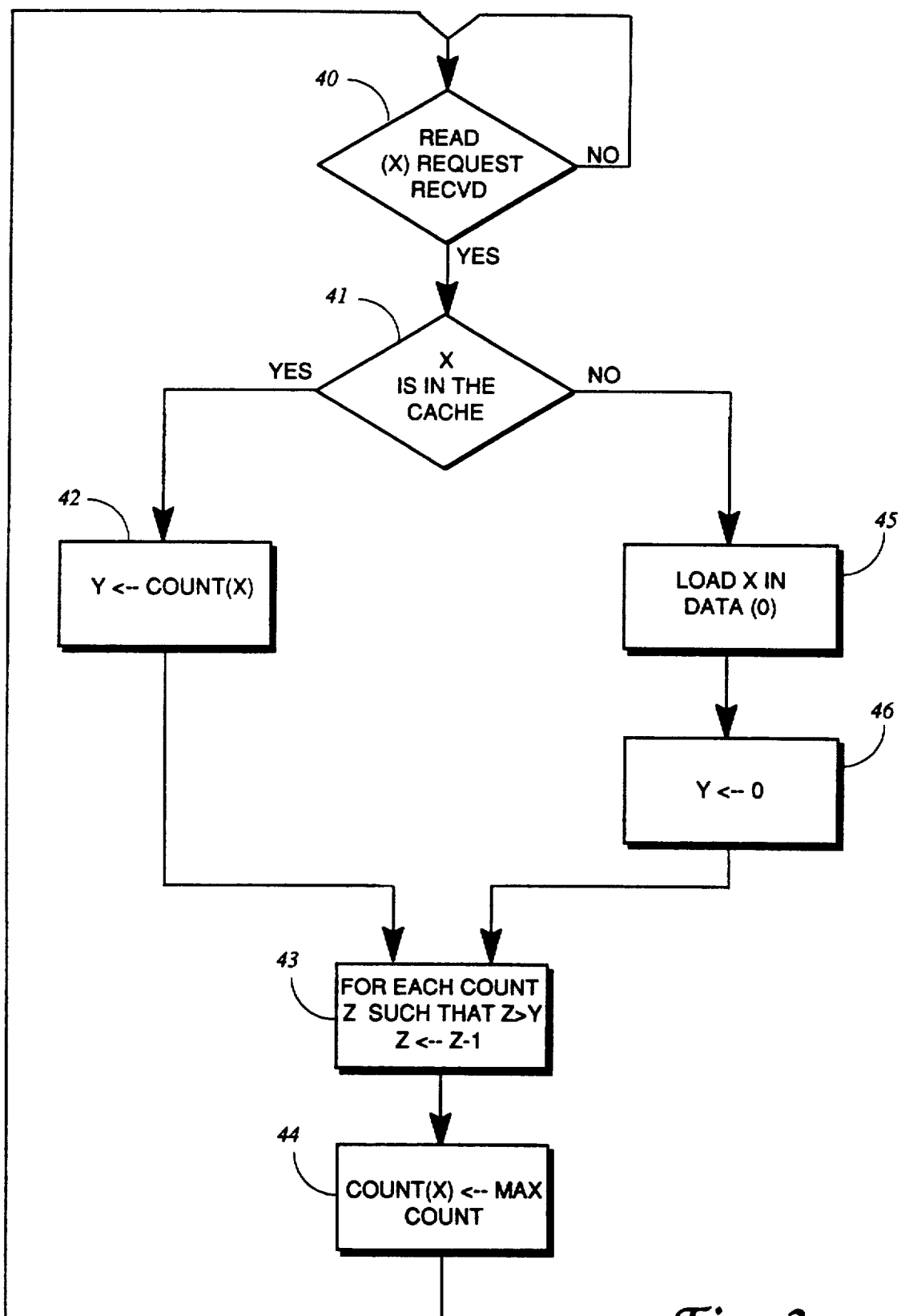
FIG. 3 is a flow chart of the preferred method of implementing the invention.

Referring to FIG. 3, the data request process starts at state 40. In this state, the cache controller waits for a read request. When there is a read request the controller moves to state 41 and determines if the the requested data, X is in the cache. If X is in the cache, the controller follows the "YES" path to state 42 where the priority tag corresponding to the requested data, X is loaded into variable Y. In state 43 each priority tag greater than Y is decremented by 1. In state 44, the requested block is given the highest priority tag. The request is complete and the controller returns to state 40.

Alternatively, if the requested data, X is not in the cache, the controller follows the "NO" path from state 41 to state 45. In state 45, the requested data X is loaded into the data field corresponding to priority tag 0. Y is then set to 0 in state 46. From state 46 the controller moves to state 43 where each priority tag greater than Y is decremented by 1. In this case, Y =0 and all priority tags are decremented. The new block of data is assigned the highest priority tag in state 44. The request is complete and the controller returns to state 40.

FIG. 4 shows the priority tag changes caused by some sample transactions in a cache memory with sixteen frames. An actual cache memory would most likely have a much larger number of frames. Sixteen frames are used for simplicity of description. The vertical axis shows the sixteen frames designated A through P. Each column shows the result of the operation designated at the top of the column. Column 50 shows a possible condition after blocks have been loaded in each frame. Priority tag 0 is in frame A and priority tag 15 in frame P. Column 51 shows a cache miss; the requested data is not in the cache. The requested data is loaded at frame A. Priority tag zero is changed to priority tag 15 and each other priority tag is decremented by 1. Columns 52 15 and each o and 53 show successive misses. Notice each time the priority tag decreases by one, except priority tag 0 which becomes priority tag 15 because the least recently used block is replaced in that frame with a new block.

Column 54 shows a cache hit on the data in frame I which has priority tag 5. This means that the data in frame 1 and corresponding to priority tag 5 is the requested data. Priority tag 5 becomes priority tag 15 and each priority tag from 6-14 is decremented by 1. Priority tags 0-4 remain the same. Column 55 shows a cache hit on the data in frame C which has priority tag 14. Priority tag 15 is decremented by 1 and priority tag 14 is changed to 15, the highest priority tag and the data is loaded in frame C. Priority tags 0-13 remain the same.

Column 56 shows a cache hit on frame F which has priority tag 2. All priority tags greater than 2 are decremented by 1, priority tag 2 is changed to 15, the new data is loaded into block F and Priority tags 0 and 1 remain the same. Column 57 shows a cache hit on frame L which has priority tag 6. All priority tags greater than 6 are decremented by 1, priority tag 6 is changed to 15 and the data is loaded into frame L. Finally, column 58 shows a hit on frame J which has priority tag 4. All priority tags greater than 4 are decremented by 1 and priority tag 4 is changed to 15. Priority tags 0–3 remain the same.

DESCRIPTION OF SOME ALTERNATE EMBODIMENTS

Cache memories are used in several application in the computer art. The improvements described here are equally applicable to any form of cache memory. Any time there is a significant difference in speed between two forms of stored data, cache memories and the present invention can be beneficial. The invention is described in terms of a two stage cache memory for a mass storage controller because that is the most effective way of implementing the invention. However, The principal invention is also effective if used with a single cache memory or other forms of multiple cache memories.

The invention would be particularly useful in a networked work station with a remote file server. In this case the mass storage is kept at a remote location and data is supplied through a network. Better cache replacements results in more cache hits. More cache hits results in less traffic on the network. Less traffic on the network results in better performance for all network users.

Although described above in terms of the preferred embodiment and a few alternates, the present invention is set forth with particularity in the appended claims. Such modifications and alterations as would be apparent to one of ordinary skill in the art and familiar with the teachings of this application shall be deemed to fall within the spirit and scope of the invention.

I claim:

1. A computer system which causes a least-recently-used algorithm for efficient cache replacement, the computer system comprising:
   a bus coupling a RAM memory means, a computing means, a cache memory, and a cache memory control means;
   a mass storage control means coupled to the cache memory control means and one or more mass-storage devices;
   the one or more mass-storage devices providing data to the cache memory in response to a request from the mass-storage control means for data, the mass-storage control means operative in response to a request from the cache memory control means for data, the cache memory control means sending a request for data to the mass-storage control means in response to a request from the computing means for data and the absence of the requested data in the cache memory;
   the cache memory including a plurality of data frames, each frame including a priority number field for receiving a priority number and a data field for receiving a block of data;
   the highest priority number being located in the same frame with the most-recently-used block of data and the lowest priority number being located in the same frame with the least-recently-used block of data; and,
   the cache memory control means maintaining the blocks of cache-data in the least-recently-used order by being operative each time a block of data is requested that is not in the cache memory to:
   (1) replace the block of data having the lowest priority number with the new block of data from the one or more mass-storage devices,
   (2) reduce the priority of each priority number, and
   (3) load the highest priority number into the priority number field corresponding to the frame containing the new block of data from the one or more mass-storage devices, and
   being operative each time a block of data is requested that is in the cache to:
   (1) reduce the priority of each priority number higher in priority than the priority of a requested block of data and
   (2) load the highest priority number into the priority number field corresponding to the frame containing the requested block of data.

2. A computer system which uses a least-recently-used algorithm for efficient cache replacement, the computer system comprising:
   a bus;
   a RAM memory coupled to the bus;
   a cache memory control means coupled to the bus;
   a cache memory, including a plurality of frames wherein each frame contains a block of data and has an associated priority number field, coupled to the bus;
   one or more mass-storage devices coupled to the cache memory and providing data to and accepting data from the cache memory;
   a processor coupled to the bus and providing requests to the cache memory control means for moving data between the mass storage devices and the RAM memory;
   initialization means, coupled to the cache memory, for initializing the priority numbers, the highest priority number being located in the same frame with the most-recently-used block of data and the lowest priority number being located in the same frame with the least-recently-used block of data;
   a mass-storage control means, coupled to the cache memory control means and one or more mass-storage devices, providing requests for data to the mass-storage devices in response to requests from the cache memory control means for data; and
   the cache memory control means providing requests for data to the mass-storage control means in response to requests from the processor for data and the absence of the requested data in the cache memory, providing requests for data to the cache memory in response to requests form the processor for data and the presence of the requested data in cache memory, providing for the numbering of the priority number fields associated with the frames in cache memory, and maintaining the blocks of cache data in the least-recently-used order by being operative each time a block of data is requested that is not in the cache memory to:
   (1) replace the block of data having the lowest priority number with the new block of data from the one or more mass-storage devices,
   (2) reduce the priority of each priority number, and (3) load the highest priority number into the priority number field corresponding to the frame containing the new block of data from the one or more mass-storage devices, and being operative each time a block of data is requested that is in the cache to:

(1) reduce the priority of each priority number higher in priority than the priority of a requested block of data and (2) load the highest priority number into the priority number field corresponding to the frame containing the requested block of data.

3. A computer system which uses a least-recently-used algorithm for efficient cache replacement, the computer system comprising:

a bus coupling a computing means, a cache memory, and a cache memory control means;

a memory control means coupled to the cache memory control means and a memory means;

the memory means providing data to the cache memory in response to a request from the memory control means for data, the memory control means operative in response to a request from the cache memory control means for data, the cache memory control means sending a request for data to the memory control means in response to a request from the computing means for data and the absence of the requested data in the cache memory;

the cache memory including a plurality of data frames, each frame including a priority number field for receiving a priority number and a data field for receiving a block of data;

the highest priority number being located in the same frame with the most-recently-used block of data and the lowest priority tag number being located in the same frame with the least-recently-used block of data; and, the cache memory control means maintaining the blocks of cache data in the least-recently-used order by being operative each time a block of data is requested that is not in the cache memory to:

(1) replace the block of data having the lowest priority number with the new block of data from the memory means, (2) reduce the priority of each priority number, and (3) load the highest priority number into the priority number field corresponding to the frame containing the new block of data from the memory means, and being operative each time a block of data is requested that is in the cache to:

(1) reduce the priority of each priority number higher in priority than the priority of a requested block of data and (2) load the highest priority number into the priority number field corresponding to the frame containing the requested block of data.

* * * * *